(12) United States Patent
Lee et al.

(10) Patent No.: US 6,490,019 B2
(45) Date of Patent: Dec. 3, 2002

(54) REFLECTIVE LIQUID CRYSTAL DISPLAY DEVICE AND THE FABRICATING METHOD THEREOF

(75) Inventors: Jae-Gu Lee, Taegu (KR); Byoung-Ho Lim, Kyoungsangbuk-do (KR)

(73) Assignee: LG. Philips LCD Co., LTD, Seoul (KR)

( * ) Notice: Subject to any disclaimer, the term of this patent is extended or adjusted under 35 U.S.C. 154(b) by 112 days.

(21) Appl. No.: 09/779,459

(22) Filed: Feb. 9, 2001

(65) Prior Publication Data

US 2001/0038428 A1 Nov. 8, 2001

(30) Foreign Application Priority Data

Feb. 10, 2000 (KR) ............................................. 00-6224

(51) Int. Cl.[7] ........................ G02F 1/1335; G02F 1/136; G02F 1/1333; G02F 1/13
(52) U.S. Cl. ........................ 349/113; 349/43; 349/138; 349/187
(58) Field of Search ............................ 349/42, 43, 138, 349/187, 46; 257/59, 72

(56) References Cited

U.S. PATENT DOCUMENTS 5,734,449 A * 3/1998 Jang .............................. 349/111
6,137,551 A * 10/2000 Jeong ........................... 257/59

FOREIGN PATENT DOCUMENTS

| JP | 3149884 | * 6/1991 |
| JP | 3278583 | * 12/1991 |
| JP | 6138483 | * 5/1994 |

* cited by examiner

Primary Examiner—William L. Sikes
Assistant Examiner—Tarifur R. Chowdhury
(74) Attorney, Agent, or Firm—Morgan, Lewis & Bockius LLP

(57) ABSTRACT

The invention provides a reflective liquid crystal display device having a semi-conic concave portion in its reflective electrode. The semi-conic concave portion increases a reflection area of the reflective electrode and prevents open-line defects of the reflective electrode. The inventive reflective liquid crystal display device includes first and second substrates; a liquid crystal layer between the first and second substrates; a first insulating layer on the first substrate; gate electrode and gate line on the first substrate; a second insulating layer covering the gate electrode and gate line; an active layer on the second insulating layer, the active layer overlapping the gate electrode; source and drain electrodes on the active layer; a data line on the second insulating layer; a third insulating layer covering the source and drain electrodes and the data line, the third insulating layer including a drain contact hole over the drain electrode; a concave portion in the passivation layer, the concave portion communicating with the first and second insulating layers and having an inclined surface with respect to the substrate; and a reflective electrode formed on the passivation layer and the concave portion.

14 Claims, 6 Drawing Sheets

REFLECTIVE LIQUID CRYSTAL DISPLAY DEVICE AND THE FABRICATING METHOD THEREOF

This application claims the benefit of Korean Patent Application No. 2000-6224, filed on Feb. 10, 2000 under 35 U.S.C. §119, the entirety of each of which is hereby incorporated by reference.

BACKGROUND OF THE INVENTION

1. Field of the Invention

The present invention relates to a liquid crystal display (LCD) device, and more particularly, to a reflective LCD device.

2. Description of Related Art

Recently, liquid crystal display (LCD) devices with light, thin, and low power consumption characteristics have been used in office automation equipment and video units and the like. Such LCDs typically uses an optical anisotropy of a liquid crystal (LC). The LC has thin and long LC molecules, which causes an orientational alignment of the LC molecules. Therefore, alignment direction of the LC molecules is controlled by applying an electric field to the LC molecules. When the alignment direction of the LC molecules are properly adjusted, the LC is aligned and light is refracted along the alignment direction of the LC molecules to display image data.

By now, an active matrix (AM) LCD where a plurality of thin film transistors (TFTs) and pixel electrodes are arranged in shape of an array matrix is most focused on because of its high resolution and superiority in displaying moving pictures. When each TFT serves to switch a corresponding pixel, the switched pixel transmits an incident light. Since an amorphous silicon layer is relatively easy formed on a large, inexpensive glass substrate, an amorphous silicon thin film transistor (a-Si:H TFT) is widely used.

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as seen in FIG. 1, which shows a transmittance (in brightness %) after light passes through each layer of the device. For this reason, the transmissive LCD device requires a high, initial brightness, and thus electric power consumption by the backlight device increases. A relatively heavy battery is needed to supply a sufficient power to the backlight of such a device. However, this has a problem that the battery can not be used for a lengthy period of time.

In order to overcome the problem described above, the reflective LCD has been developed. Since the reflective LCD device uses ambient light, it is light and easy to carry. Also, the reflective LCD device is superior in aperture ratio to the transmissive LCD device.

FIG. 2 shows a pixel of a typical reflective LCD device in plane view. As shown in FIG. 2, Nth gate line 8 and (N-1)th gate line 6 are transversely formed on an insulated substrate (reference 1 of FIG. 3A), while Nth data line 2 and (N+1)th data line 4 are formed perpendicular to the gate lines 6 and 8. Near a cross point of the gate and data lines 2 and 8, a gate electrode 18 is formed, and a source electrode 12 overlaps the gate electrode 18. Opposite to the source electrode 12, a drain electrode 14 is formed. The drain electrode 14 electrically contacts a reflective electrode 10 via a drain contact hole 16, which is a through hole formed over the drain electrode 14.

The reflective electrode 10, which is formed over a pixel region defined by the gate and data lines, has a plurality of concave portions 20 on itself. The concave portions 20 enhance a reflective area of the reflective electrode 10 and prevent a mirror effect of the reflective electrode 10. An opaque metal is conventionally selected for the reflective electrode 10 to reflect an incident light. When light is incident to the reflective electrode 10, the concave portions 20 induce a diffused reflection of the incident light such that the mirror effect of the reflective electrode 10 decreases.

Now, with reference to FIGS. 3A to 3D, a fabricating process for the typical reflective LCD device shown in FIG. 2 will be explained in detail.

At first, a first metal layer is deposited on an insulated substrate 1 of FIG. 3A and patterned to form the gate electrode 18 and gate lines (reference 2 and 4 of FIG. 2). The first metal layer for the gate electrode 18 is selected from a group consisting of chromium (Cr), molybdenum (Mo), aluminum (Al), titanium (Ti), tin (Sb), tungsten (W), and copper (Cu). A sputtering process is used for depositing the first metal layer.

Next, as shown in FIG. 2B, a gate-insulating layer 30 formed to cover the gate electrode 18 and the gate lines on the lower substrate 1. Silicon nitride ($SiN_x$) or silicon oxide ($SiO_2$) is selected for the gate-insulating layer 30. Thereafter, a silicon layer is deposited and patterned on the gate-insulating layer 30 to form a silicon island 32, which serves as an active layer for a thin film transistor. On the silicon island 32, the source and drain electrodes 12 and 14 are formed.

Next, as shown in FIG. 3C, a passivation layer 34 is formed to cover the source electrode 12 and drain electrode 14 such that the source electrode 12, the drain electrode 14 and the silicon island 32 are protected from other electrodes, which will be formed in later steps. Over the drain electrode 14, the drain contact hole 16 is formed through the passivation layer 34. The passivation layer 34 also has a plurality of concave portions 20a, which correspond to the concave portions 20 of the reflective electrode 10. Silicon nitride ($SiN_x$) or silicon oxide ($SiO_2$) is selected for the passivation layer 34 like the gate-insulating layer 30.

Next, as shown in FIG. 3D, the reflective electrode 10 is formed on the passivation layer 34. As explained previously, the reflective electrode 10 electrically contacts the drain electrode 14 via the drain contact hole 16, and the concave portions 20 of the reflective electrode 10 induce the diffused reflection of an incident light.

FIG. 4 is a partial sectional view of the typical reflective LCD device shown in FIG. 2. As shown, an upper substrate 44 having an insulated substrate 1, a color filter layer 46 and a common electrode 48 is spaced apart from a lower substrate 40 that is formed via the above-explained process. In the spacing between the upper and lower substrates 44 and 40, a liquid crystal layer 42 is interposed. As mentioned previously, the typical reflective LCD device uses an ambient light incident from an external light source. The reflective electrode 10 of the reflective LCD device serves to reflect the incident light.

FIG. 5 illustrates a problem of the conventional reflective LCD device described in FIG. 4. As shown, the concave portion 20 conventionally has a cylindrical shape with a depth "d1" measured from a surface of the substrate (reference 1 of FIG. 4). Since edges of the concave portion 20 are sharply stepped, open lines 22 occur in the reflective electrode 10 around the edges of the concave portion 20. Further, due to a cylindrical shape of the concave portion 20, an incident ray 24a incident onto a bottom surface of the concave portion 20 and a reflected ray 24b reflected from the bottom surface have a very narrow range of incident angles. Therefore, though the concave portion 20 prevents the mirror effect of the reflective electrode 10, the reflection efficiency of the reflective electrode 10 becomes lower due to the concave portion 20.

SUMMARY OF THE INVENTION

Accordingly, the present invention is directed to a transflective liquid crystal display device that substantially obviates one or more of the problems due to limitations and disadvantages of the related art.

An aspect of the invention is to provide a reflective LCD device that can reduce the open-line errors resulting from the cylindrical shape of the concave portions formed on the reflective electrode.

Another aspect of the invention is to provide a reflective LCD device that has superior reflection efficiency.

In accordance with the purpose of the invention, as embodied and broadly described, in one aspect the invention includes a transflective liquid crystal display device, including: first and second substrates; a liquid crystal layer between the first and second substrates; a first insulating layer on the first substrate; gate electrode and gate line on the first substrate; a second insulating layer covering the gate electrode and gate line; an active layer on the second insulating layer, the active layer overlapping the gate electrode; source and drain electrodes on the active layer; a data line on the second insulating layer; a third insulating layer covering the source and drain electrodes and the data line, the third insulating layer including a drain contact hole over the drain electrode; a concave portion in the passivation layer, the concave portion communicating with the first and second insulating layers and having an inclined surface with respect to the substrate; and a reflective electrode formed on the passivation layer and the concave portion.

The active layer includes an amorphous silicon layer and a doped amorphous silicon layer.

The gate electrode, source electrode, drain electrode, and the reflective electrode include an opaque metal. The opaque metal is selected from a group consisting of chromium (Cr), molybdenum (Mo), aluminum (Al), titanium (Ti), tin (Sb), tungsten (W), and copper (Cu).

The first and second insulating layers are selected from a group consisting of silicon nitride ($SiN_x$) and silicon oxide ($SiO_2$). The third insulating layer is an organic insulating layer. The organic insulating layer includes benzocyclobutene.

The concave portion has a semi-conic shape.

In another aspect, the invention includes a fabricating method for a reflective liquid crystal, the method including: forming a first insulating layer on an insulated substrate; forming a gate electrode on the first insulating layer; forming a second insulating layer on the first insulating layer, the second insulating layer covering the gate electrode; forming an active layer on the second insulating layer; forming source and drain electrodes on the active layer; forming a third insulating layer on the second insulating layer, the third insulating layer covering the source and drain electrodes; integrally patterning the passivation layer, second insulating layer, and first insulating layer to form a concave portion in the passivation layer; and forming a reflective layer on the passivation layer and the concave portion.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 1:
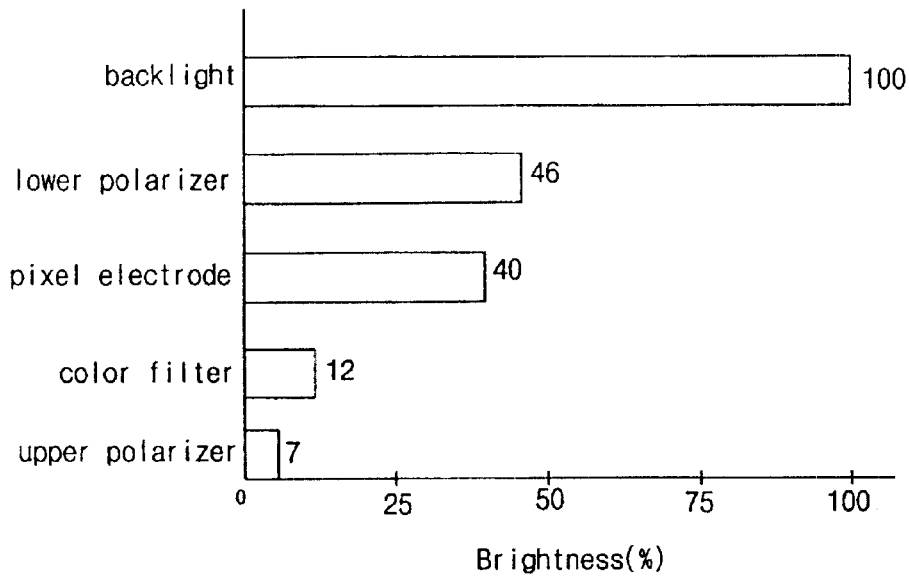
FIG. 1 is a graph illustrating transmittance after light passes through each layers of a typical transmissive LCD device.
Figure 2:
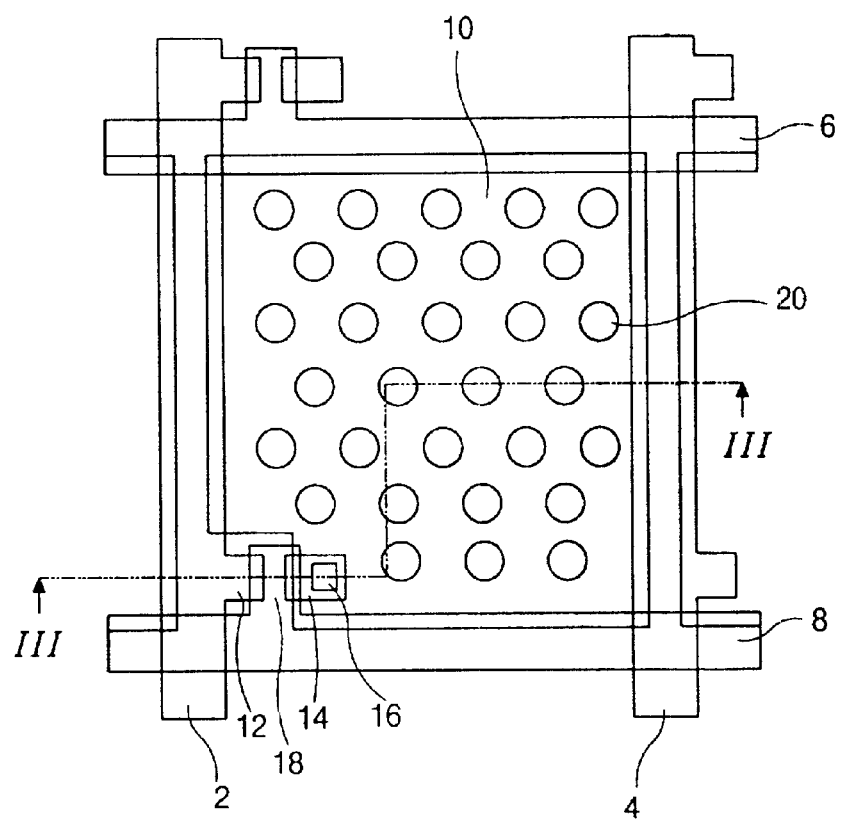
FIG. 2 is a plane view illustrating a typical reflective LCD device.
Figure 3A:
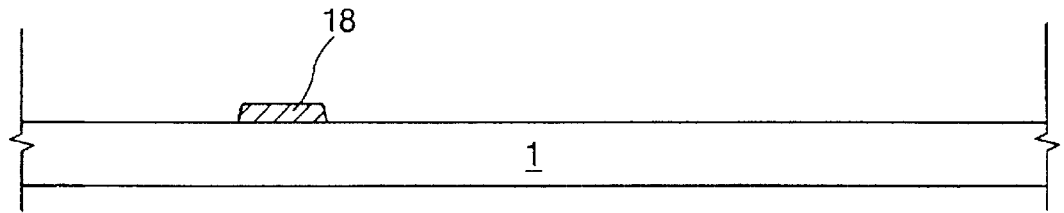
FIGS. 3A to 3D are cross-sectional views taken along a line "—" of FIG. 2.
Figure 3B:
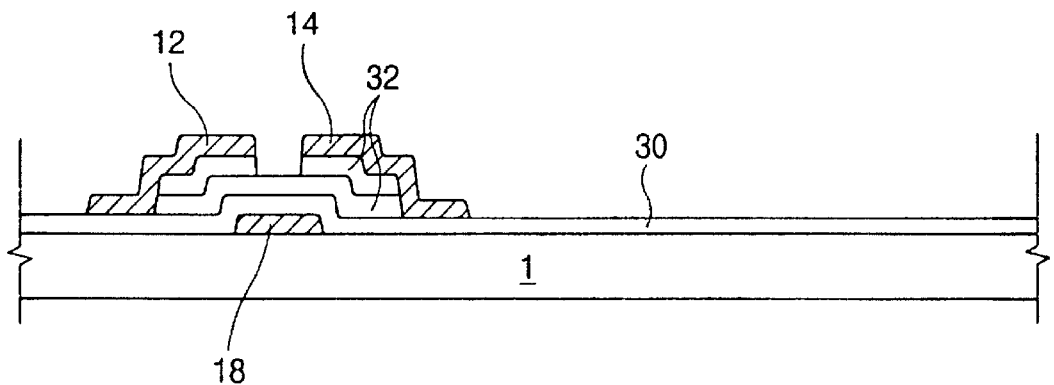
Figure 3C:
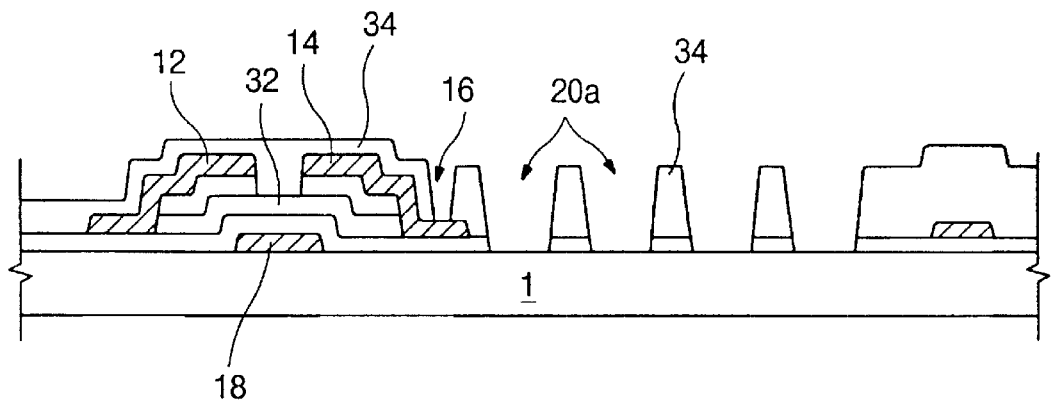
Figure 3D:
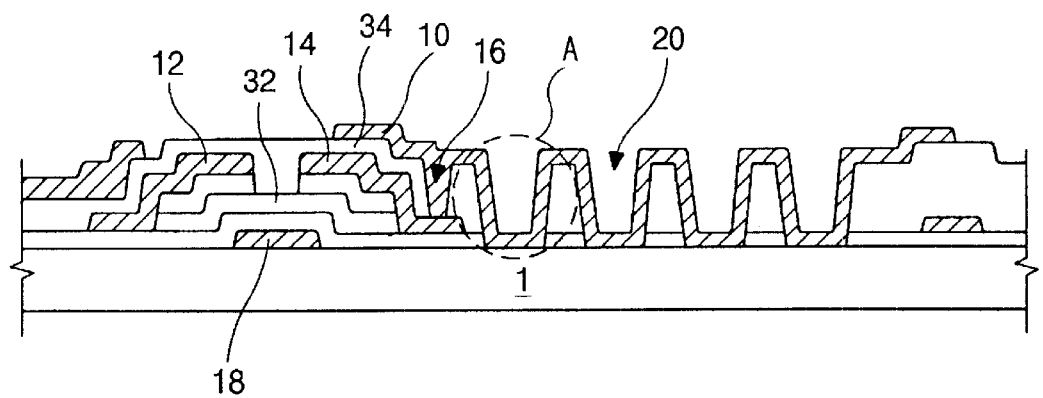
Figure 4:
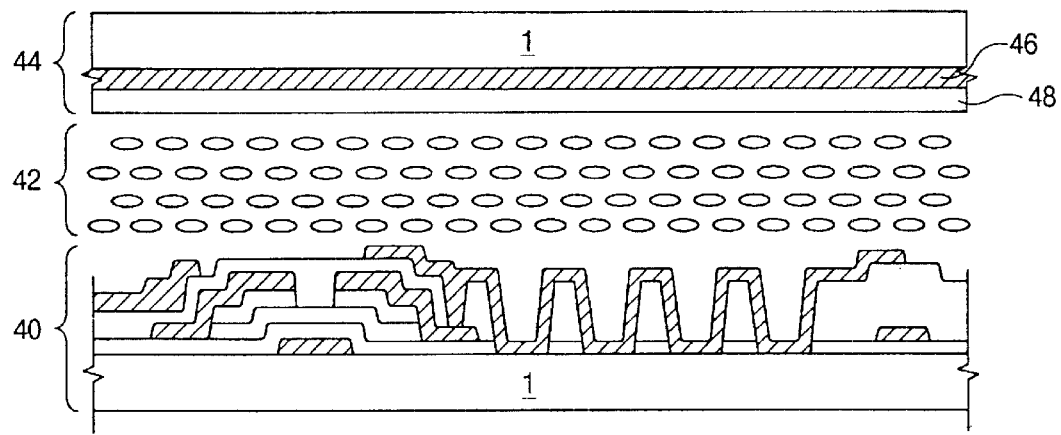
FIG. 4 is a partial cross-sectional view of the conventional reflective LCD device.
Figure 6A:
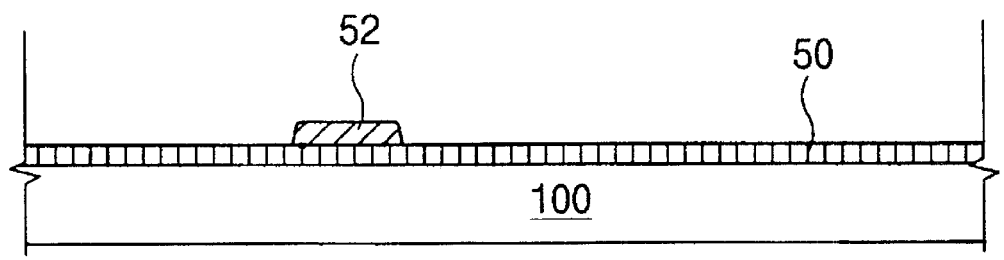
FIGS. 6a to 6d illustrate a fabricating process of a reflective LCD device according to a preferred embodiment of the present invention.

FIGS. 6A to 6D are cross-sectional views illustrating a fabricating method for a reflective LCD device according to the preferred embodiment of the present invention. At first, as shown in FIG. 6A, a first insulating layer 50 is formed on an insulated substrate 100, and a gate electrode 52 is formed on the first insulating layer 50. At the same time as the gate electrode 52 is formed, a gate line (see FIG. 2) is integrally formed. The first insulating layer 50 is preferably selected from a group consisting of silicon nitride ($SiN_x$) and silicon oxide ($SiO_2$), while the gate electrode 52 is preferably selected from a group consisting of chromium (Cr), molybdenum (Mo), aluminum (Al), titanium (Ti), tin (Sb), tungsten (W), and copper (Cu).

Figure 6B:
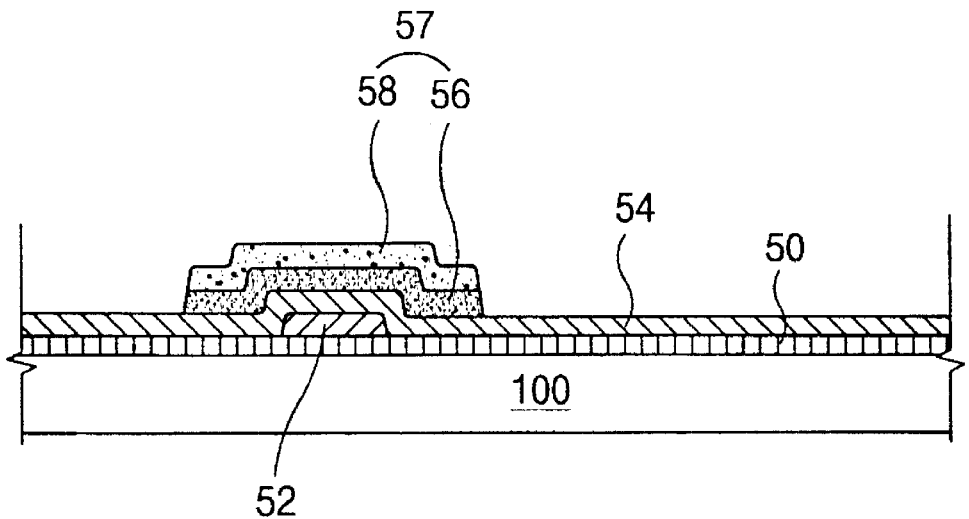

Next, as shown in FIG. 6B, a second insulating layer 54 is formed to cover the gate electrode 52 and the gate line (not shown). The second insulating layer 54 preferably has the same material as the first insulating layer 50, which is an inorganic insulating layer. Thereafter, an active layer 57 having amorphous silicon layer 56 and doped amorphous silicon layer 58 is formed on the second insulating layer 54.

Figure 6C:
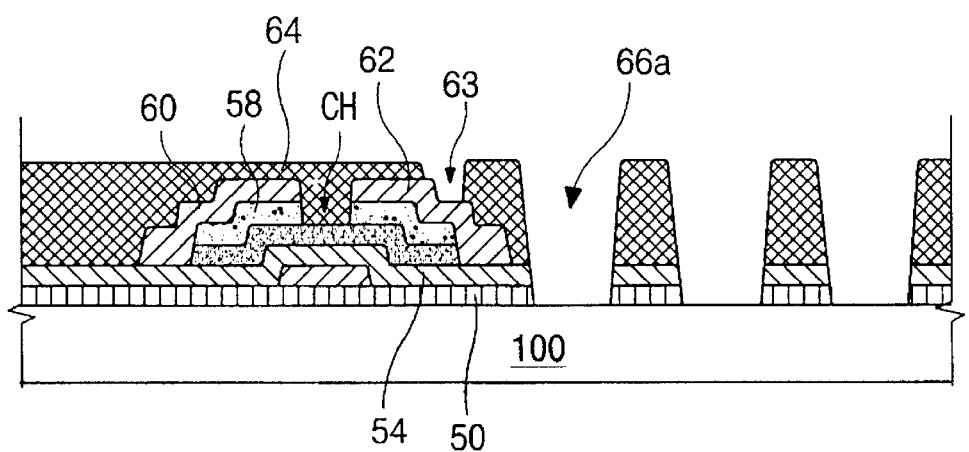

Next, as shown in FIG. 6C, source electrode 60 and drain electrode 62 are formed on the doped amorphous silicon layer 58. At this time, a portion of the doped amorphous silicon layer 58 is etched away to form a channel "CH" between the source and drain electrodes 60 and 62. A data line (reference 2 or 4 in FIG. 2) is preferably formed in the same layer as the source and drain electrodes 60 and 62. The source and drain electrode 60 and 62, and the data line are preferably selected from a group consisting of chromium (Cr), molybdenum (Mo), aluminum (Al), titanium (Ti), tin (Sb), tungsten (W), and copper (Cu).

Thereafter, a passivation layer 64 is formed over the insulated substrate 100 to cover the source and drain electrodes 60 and 62, and a drain contact hole 63 of a through hole is formed over the drain electrode 62. Preferably, the passivation layer 64 is an organic insulating layer including benzocyclobutene (BCB) and the like, which is a different material from the first and second insulating layers 50 and 54 of the inorganic insulating layers. Further, the first insulating layer 50, second insulating layer 54, and passivation layer 64 are etched away to pattern a plurality of concave portions 66a are over the insulated substrate 100.

A dry-etching method is preferably used for patterning the concave portions 66a. At this point, since the passivation layer 64 has the different material from the first and second insulating layers 50 and 54, the passivation layer 64 differs from the first and second insulating layers 50 and 54 in their etching rates. Specifically, the passivation layer 64 of the organic insulating layer has a greater etching rate than the first and second insulating layers 50 and 54 of the inorganic insulating layers. In other words, during an etching process for patterning the concave portions 66a, the passivation layer 64 is more etched away than the first and second insulating layers 50 and 54 are etched away. Accordingly, each concave portion 66a has a tapered or semi-conic shape, which has inclined sidelines in its section such that a diameter of the concave portion 66a becomes smaller along its depth. The first insulating layer 50 serves to enhance an etched time of the passivation layer 64 and the second insulating layer such that the concave portion 66a has a more smooth semi-conic shape.

Figure 6D:
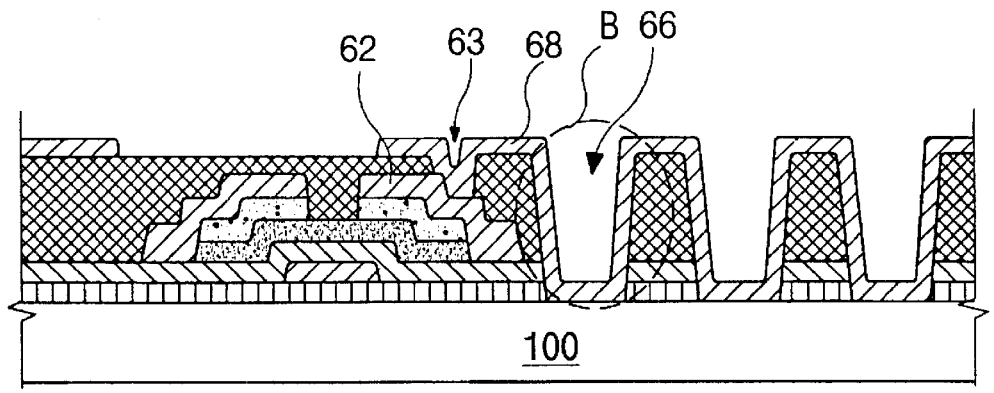

Next, as shown in FIG. 6D, a reflective electrode 68 is formed on the passivation layer 64 including the concave portions (reference 66a of FIG. 6C). The reflective electrode 68 electrically contacts the drain electrode 62 via the drain contact hole 63, and covers the surface of the concave portions 66a of the passivation layer 64 to form concave portions 66 of the reflective electrode 68.

Figure 5:
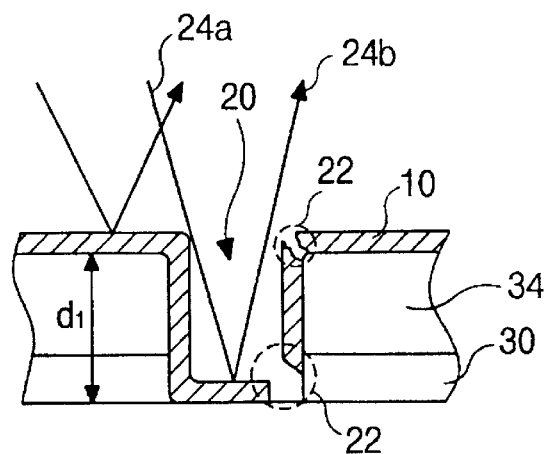
FIG. 5 is an enlarged view of a portion "A" of FIG. 3D.
Figure 7:
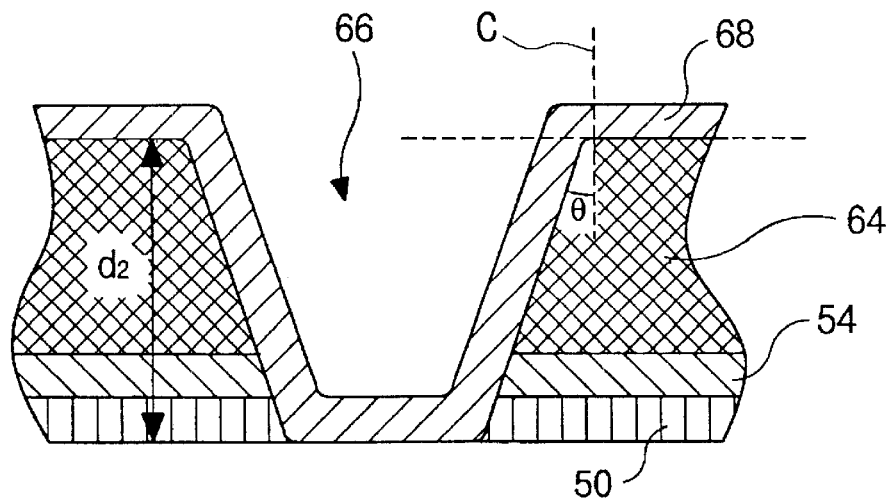
FIG. 7 is an enlarged view of a portion "B" of FIG. 6d.

FIG. 7 is an expanded cross-sectional view of a portion "B" shown in FIG. 6D. As shown, each concave portion 66 of the reflective electrode 68 is formed along the patterned surfaces of the first insulating layer 50, second insulating layer 54, and passivation layer 64. In the cross-sectional view, each sideline of the concave portion 66 makes an oblique angle "θ" with respect to a perpendicular line "C" that is perpendicular to the insulated substrate 100. Therefore, since edges of the concave portion 66 are relatively smoothly shaped, open-line defects shown in FIG. 5 are prevented in the reflective electrode 68. In addition, because the semi-conic surface of the concave portions 66 enlarges a reflection area of the reflective electrode 68, a reflection efficiency of the reflective electrode 68 is greater than that of a conventional reflective electrode in a cylindrical shape shown in FIG. 5.

At this point, since the passivation layer 64 is the organic insulating layer, it is preferably thicker than the inorganic insulating layer used for the first and second insulating layer 50 and 54 or a conventional passivation layer. Therefore, a depth "d2" of the concave portion 66 of the inventive reflective LCD device is much greater than a depth "d1" of the conventional reflective LCD device shown in FIG. 5 (d1<d2).

In short, in the preferred embodiment of the present invention, the reflective electrode has the semi-conic concave portions, which increase the reflection area of the reflective electrode and prevent the open-line defects thereof.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A reflective liquid crystal display device comprising:
   first and second substrates;
   a liquid crystal layer between the first and second substrates;
   a first insulating layer on the first substrate;
   a gate electrode and a gate line on the first substrate;
   a second insulating layer covering the gate electrode and gate line;
   an active layer on the second insulating layer, the active layer overlapping the gate electrode;
   source and drain electrodes on the active layer;
   a data line on the second insulating layer;
   a third insulating layer covering the source and drain electrodes and the data line, the third insulating layer including a drain contact hole over the drain electrode,
   a concave portion being defined through the first, second, and third insulating layers such that the concave portion has an inclined surface with respect to the substrate;
   a reflective electrode formed on the third insulating layer and the concave portion.

2. The device of claim 1, wherein the active layer includes an amorphous silicon layer and a doped amorphous silicon layer.

3. The device of claim 1, wherein the gate electrode, source electrode, drain electrode, and the reflective electrode include an opaque metal.

4. The device of claim 3, wherein the opaque metal is selected from a group consisting of chromium (Cr), molybdenum (Mo), aluminum (Al), titanium (Ti), tin (Sb), tungsten (W), and copper (Cu).

5. The device of claim 1, wherein the first and second insulating layer are selected from a group consisting of silicon nitride ($SiN_x$) and silicon oxide ($SiO_2$).

6. The device of claim 1, wherein the third insulating layer is an organic insulating layer.

7. The device of claim 6, wherein the organic insulating layer includes benzocyclobutene.

8. The device of claim 1, wherein the concave portion has a semi-conic shape.

9. A fabricating method for a reflective LCD device, the method comprising:
   forming a first insulating layer on an insulated substrate;
   forming a gate electrode on the first insulating layer;
   forming a second insulating layer on the first insulating layer, the second insulating layer covering the gate electrode;

forming an active layer on the second insulating layer;

forming source and drain electrodes on the active layer;

forming a third insulating layer on the second insulating layer, the third insulating layer covering the source and drain electrodes;

integrally patterning the third insulating layer, second insulating layer, and first insulating layer to form a concave portion in the third insulating layer; and forming a reflective layer on the third insulating layer and the concave portion.

10. The method of claim 9, wherein the first and second insulating layer are selected from a group consisting of silicon nitride ($SiN_x$) and silicon oxide ($SiO_2$).

11. The method of claim 9, wherein the third insulating layer is an organic insulating layer.

12. The method of claim 11, wherein the organic insulating layer includes benzocyclobutene.

13. The method of claim 9, wherein the gate electrode, source electrode, drain electrode, and the reflective electrode include an opaque metal.

14. The method of claim 13, wherein the opaque metal is selected from a group consisting of chromium (Cr), molybdenum (Mo), aluminum (Al), titanium (Ti), tin (Sb), tungsten (W), and copper (Cu).

* * * * *